US012666308B2

(12) United States Patent
Forenza et al.

(10) Patent No.: US 12,666,308 B2
(45) Date of Patent: Jun. 23, 2026

(54) NON-REAL-TIME RIC ARCHITECTURE SUPPORTING COORDINATED RAN AND CORE INFORMATION SHARING AND CONTROL

(71) Applicant: Rakuten Symphony, Inc., Tokyo (JP)

(72) Inventors: Antonio Forenza, San Mateo, CA (US); Ankur Chauhan, Bangalore (IN); Kexuan Sun, Surrey (GB)

(73) Assignee: RAKUTEN SYMPHONY, INC., Tokyo (JP)

( * ) Notice: Subject to any disclaimer, the term of this patent is extended or adjusted under 35 U.S.C. 154(b) by 76 days.

(21) Appl. No.: 18/016,891

(22) PCT Filed: Nov. 28, 2022

(86) PCT No.: PCT/US2022/051050
§ 371 (c)(1),
(2) Date: Jan. 19, 2023

(87) PCT Pub. No.: WO2024/081006
PCT Pub. Date: Apr. 18, 2024

(65) Prior Publication Data
US 2024/0250879 A1      Jul. 25, 2024

(30) Foreign Application Priority Data

Oct. 13, 2022      (IN) ............................. 202241058574

(51) Int. Cl.
*H04L 41/16*          (2022.01)
*H04L 41/0894*          (2022.01)
*H04W 28/08*          (2023.01)
(52) U.S. Cl.
CPC ..... *H04W 28/0925* (2020.05); *H04L 41/0894* (2022.05); *H04L 41/16* (2013.01); *H04W 28/0958* (2020.05)

(58) Field of Classification Search
CPC ........................... H04L 41/0894; H04L 41/16
See application file for complete search history.

(56) References Cited

U.S. PATENT DOCUMENTS 6,801,508 B1 * 10/2004 Lim .................... H04L 12/5601
370/310.1
2021/0235473 A1      7/2021  Parekh et al.
(Continued)

FOREIGN PATENT DOCUMENTS

EP          3 855 841 A1      7/2021
EP          3 869 847 A1      8/2021
(Continued)

OTHER PUBLICATIONS

International Search Report dated Mar. 29, 2023, issued in International Application No. PCT/US22/51050.
(Continued)

*Primary Examiner* — David R Lazaro
*Assistant Examiner* — Xiang Yu
(74) *Attorney, Agent, or Firm* — Sughrue Mion, PLLC

(57)          ABSTRACT

A method for policy/control implementation includes retrieving, by a non-real-time (NRT) radio access network (RAN) Intelligent Controller (RIC) from a core network external to the NRT RIC via a first external interface, first enrichment data corresponding to core network information, determining, by the NRT RIC, at least one policy/control to be implemented in a RAN including the NRT RIC, based on the first enrichment data, and implementing, by the NRT RIC, the at least one policy/control in the RAN.

21 Claims, 8 Drawing Sheets

(56)                         References Cited

U.S. PATENT DOCUMENTS

| | | | |
|---|---|---|---|
| 2021/0385686 A1 | 12/2021 | Ahmed et al. | |
| 2022/0116799 A1 | 4/2022 | Wang et al. | |
| 2022/0256359 A1* | 8/2022 | Awoniyi-Oteri | ...... H04W 16/28 |

FOREIGN PATENT DOCUMENTS

| | | | |
|---|---|---|---|
| EP | 3 920 468 A1 | 12/2021 | |
| JP | 2022-149390 A | 10/2022 | |
| JP | 2024-044067 A | 4/2024 | |
| WO | 2022/155511 A1 | 7/2022 | |

OTHER PUBLICATIONS

Written Opinion dated Mar. 29, 2023 issued in International Application No. PCT/US 22/51050.
The O-RAN Alliance e.V., "O-RAN Use Cases Detailed Specification 8.0", O-RAN.WG1.Use-Cases-Detailed-Specification-v08.00, Jul. 3, 2022 (36 pages).
Japanese Office Action dated Nov. 18, 2025 in Application No. 2024-572679.

\* cited by examiner

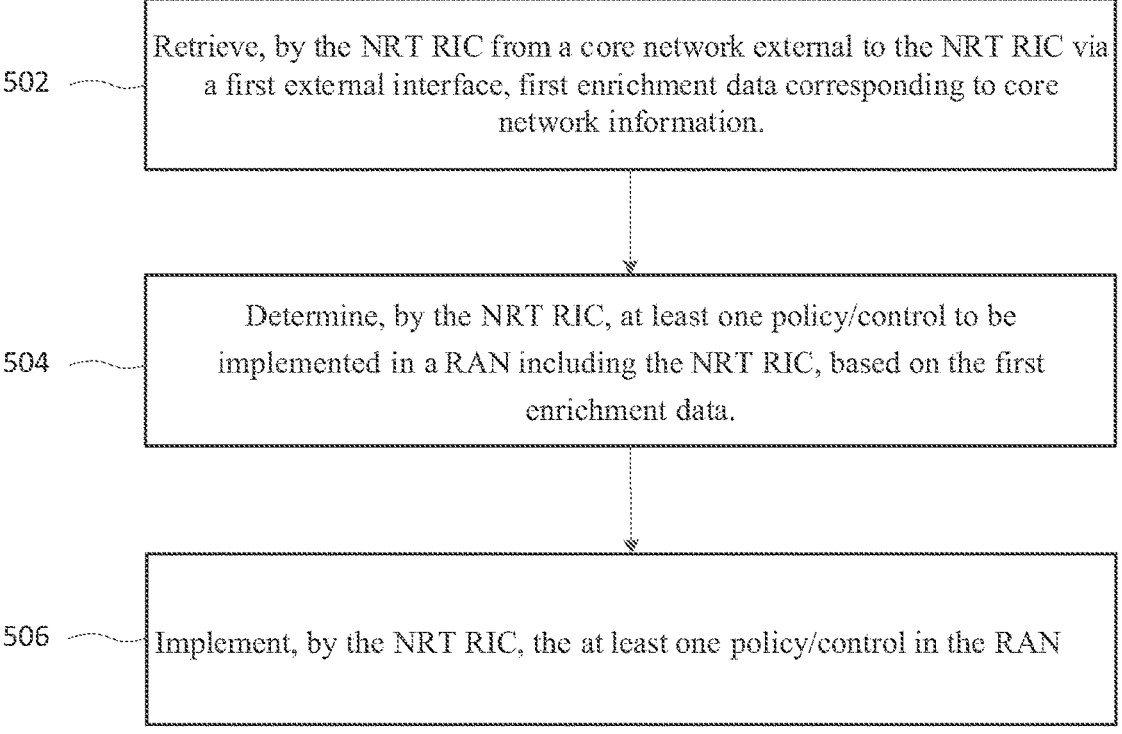

502 — Retrieve, by the NRT RIC from a core network external to the NRT RIC via a first external interface, first enrichment data corresponding to core network information.

504 — Determine, by the NRT RIC, at least one policy/control to be implemented in a RAN including the NRT RIC, based on the first enrichment data.

506 — Implement, by the NRT RIC, the at least one policy/control in the RAN

FIG. 5

NON-REAL-TIME RIC ARCHITECTURE SUPPORTING COORDINATED RAN AND CORE INFORMATION SHARING AND CONTROL

CROSS-REFERENCE TO RELATED APPLICATION(S)

This application is a National Stage of International Application No. PCT/US2022/051050 filed Nov. 28, 2022, claiming priority to based on Indian Patent Application number 202241058574, filed on Oct. 13, 2022, in the Indian Patent Office, the disclosure of which is incorporated by reference herein in its entirety.

BACKGROUND

1. Field

Apparatuses and methods consistent with example embodiments of the present disclosure relate to policy/control implementation in a Service Management and Orchestration (SMO) framework.

2. Description of Related Art

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 is a diagram of a related art O-RAN architecture, FIG. 2 is a diagram of a related art Service Management and Orchestration (SMO) framework with a non-real-time (NRT) RAN Intelligent Controller (RIC) architecture in a functional view, and FIG. 3 is a diagram of a related art SMO framework with an NRT RIC in a services view. Referring to FIGS. 1 through 3, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: an NRT RIC and a near-real-time RIC (nRT RIC).

The NRT RIC is the control point of a non-real-time control loop and operates on a timescale greater than 1 second within the SMO framework. Its functionalities are implemented through modular applications called rApps (rApp 1, . . . , rApp N in FIGS. 1-3), and include: providing policy based guidance and enrichment across the A1 interface, which is the interface that enables communication between the NRT RIC and the nRT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT RIC, O-RAN Centralized Unit (O-CU), O-RAN Distributed Unit (O-DU), etc.).

The nRT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT RIC uses the E2 interface to control the underlying RAN elements (E2 nodes/network functions (NFs)) over a near-real-time control loop. The nRT RIC monitors, suspends/stops, overrides, and controls the E2 nodes (O-CU, O-DU, and O-eNB) via policies. For example, the nRT sets policy parameters on activated functions of the E2 nodes. Further, the nRT RIC hosts xApps to implement functions such as quality of service (QOS) optimization, mobility optimization, slicing optimization, interference mitigation, load balancing, security, etc. The two types of RICs work together to optimize the O-RAN. For example, the NRT RIC provides, over the A1 interface, the policies, data, and artificial intelligence (AI)/machine learning (ML) models enforced and used by the nRT RIC for RAN optimization, and the nRT returns policy feedback (i.e., how the policy set by the NRT RIC works).

The SMO framework, within which the NRT RIC is located, manages and orchestrates RAN elements. Specifically, the SMO manages and orchestrates what is referred to as the O-RAN Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

In the related art, an NRT RIC can only control RAN parameters. NRT RIC architectures of the related art cannot control other parameters of the network such as parameters for the core network (e.g., $4^{th}$ generation (4G)-long term evolution (LTE) evolved packet core (EPC), $5^{th}$ generation (5G) new radio (NR) Core, etc.), inventory or geolocation information. Furthermore, an intelligent controller for RAN layer and a core network may work. Thus, the lack of coordination between the RAN and core controllers may lead to significant conflicts and performance degradations of the network.

Additionally, the systems of the related art do not provide enrichment of the AI/ML models at the NRT RIC with inventory, geolocation, user equipment (UE) specific configurations from the core network (or other external sources) and/or from the planning data. Further, the systems of the related art do not facilitate the access of the parameters, contexts and event information in the core network.

SUMMARY

According to embodiments, systems and methods are provided for policy/control implementation in a Service Management and Orchestration (SMO) framework and a core network based on externally obtained enrichment data and information sharing between the core network and the SMO.

According to an aspect of the disclosure, a method for policy/control implementation may include retrieving, by a non-real-time (NRT) radio access network (RAN) Intelligent Controller (RIC) from a core network external to the NRT RIC via a first external interface, first enrichment data corresponding to core network information, determining, by the NRT RIC, at least one policy/control to be implemented in a RAN including the NRT RIC, based on the first enrichment data, and implementing, by the NRT RIC, the at least one policy/control in the RAN.

According to an aspect of the disclosure, a system for policy/control implementation may include a memory storing instructions, and a processor configured to execute the instructions to retrieve, by a NRT RIC from a core network external to the NRT RIC via a first external interface, first enrichment data corresponding to core network information, determine, by the NRT RIC, at least one policy/control to be implemented in a RAN including the NRT RIC, based on the first enrichment data, and implement, by the NRT RIC, the at least one policy/control in the RAN.

According to an aspect of the disclosure, a non-transitory computer-readable storage medium may store instructions that, when executed by at least one processor, cause the at least one processor to retrieve, by an NRT RIC from a core network external to the NRT RIC via a first external interface, first enrichment data corresponding to core network information, determine, by the NRT RIC, at least one policy/control to be implemented in a RAN including the NRT RIC, based on the first enrichment data, and implement, by the NRT RIC, the at least one policy/control in the RAN.

According to an aspect of the disclosure, a method for policy/control implementation may include retrieving, by a core network from an NRT RIC external to the core network via a first external interface, first enrichment data corresponding to RAN information, determining, by the core network, at least one policy/control to be implemented in the core network, based on the first enrichment data, implementing, by the core network, the at least one policy/control in the core network.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 5 is a flowchart of a method for policy/control implementation in an O-RAN architecture, according to an embodiment;

DETAILED DESCRIPTION

Figure 1:
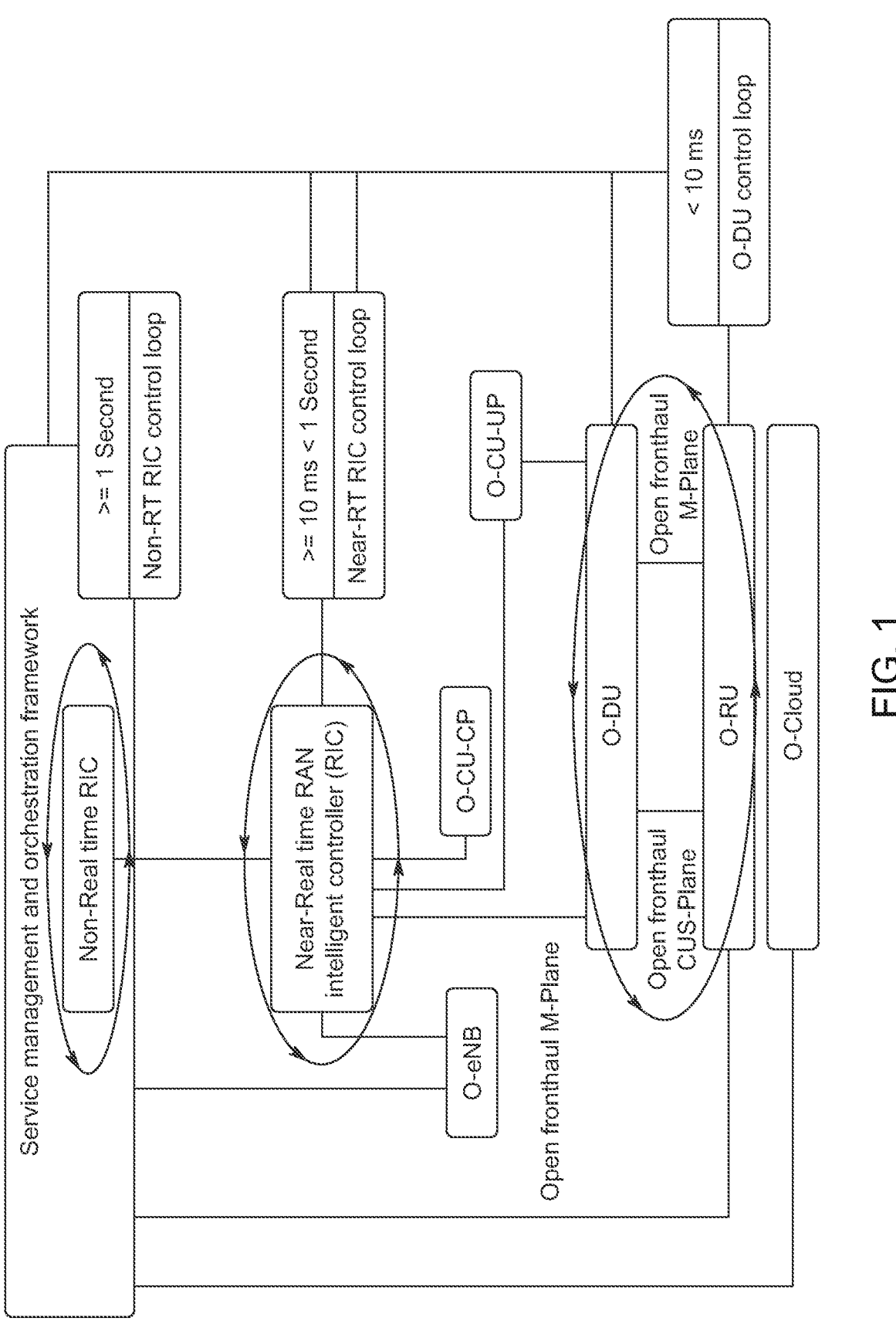
FIG. 1 is a diagram of an open radio access network (O-RAN) architecture according to related art.
Figure 2:
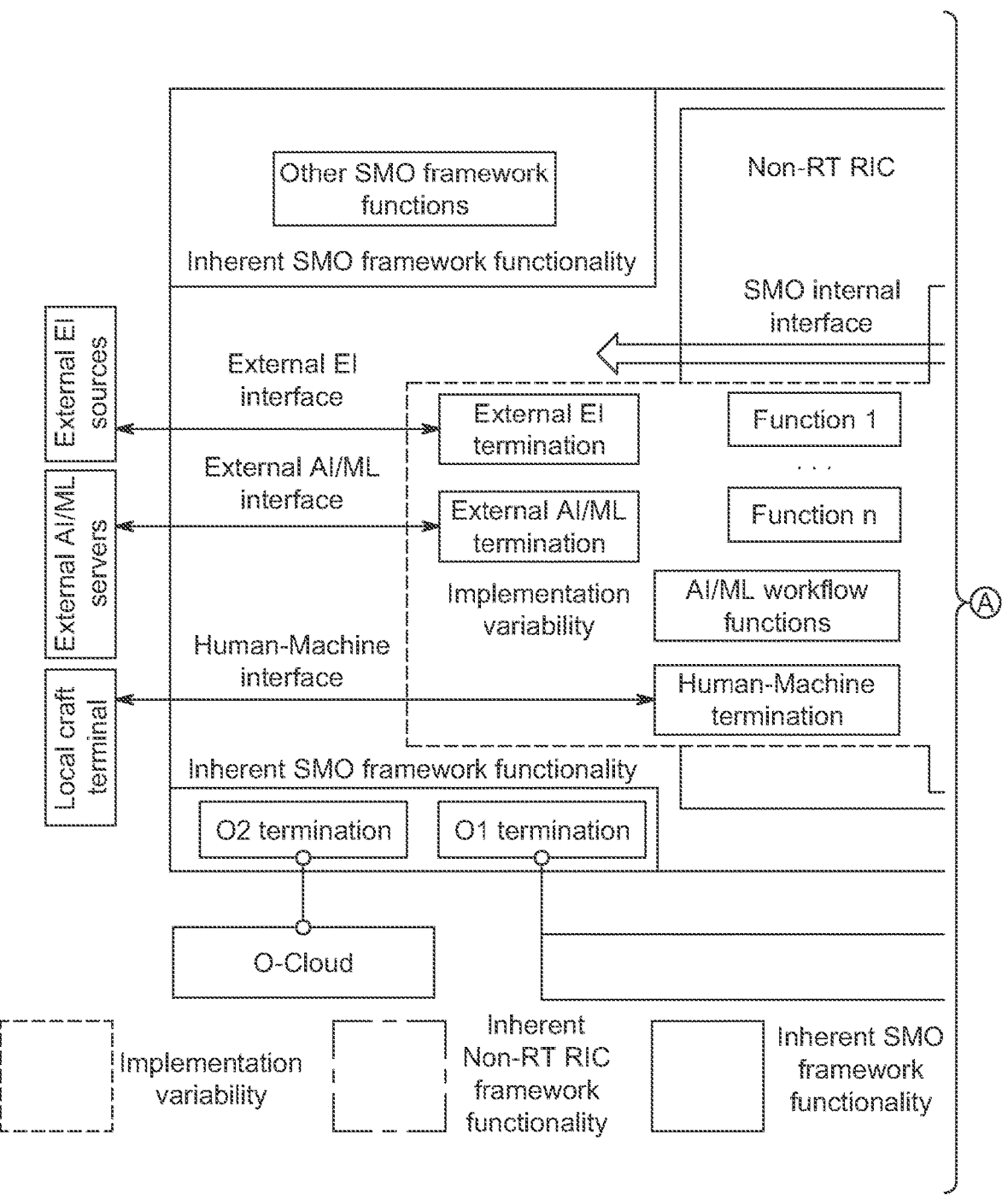
FIG. 2 is a diagram of a Service Management and Orchestration (SMO) framework with a non-real-time (NRT) RAN Intelligent Controller (RIC) architecture in a functional view according to related art.
Figure 2:
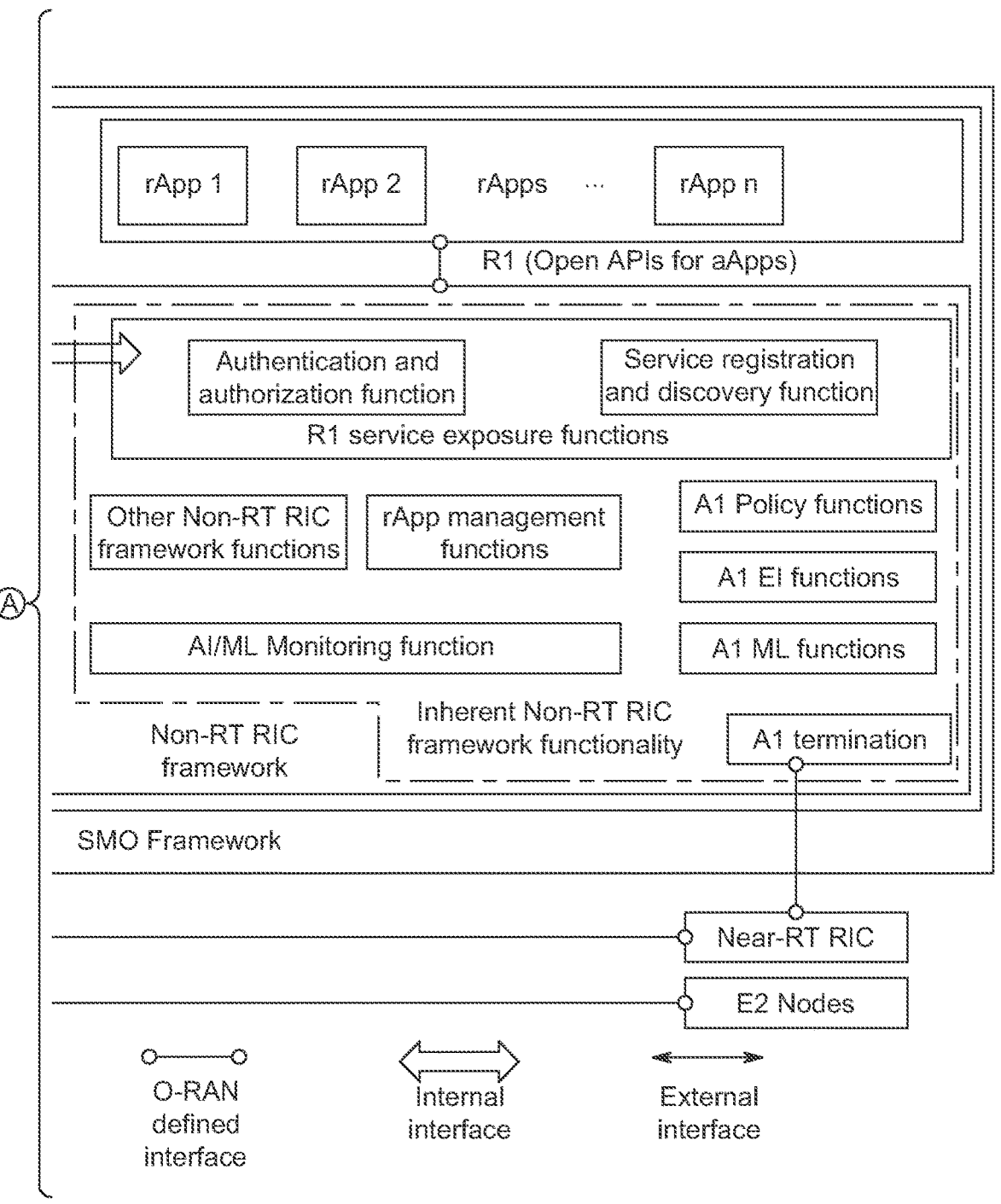
Figure 3:
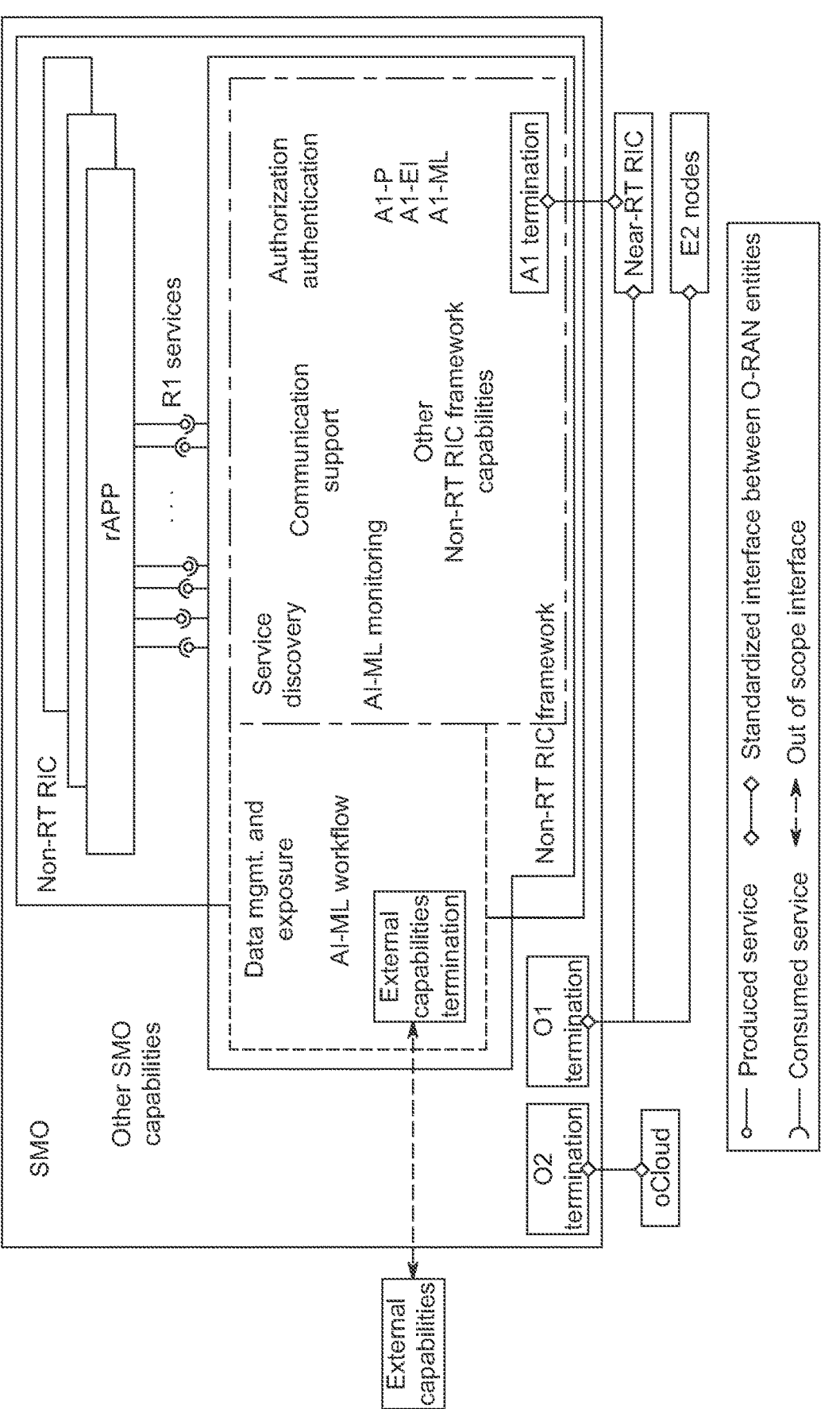
FIG. 3 is a diagram of a related art SMO framework with an NRT RIC in a services view according to related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments provide systems, methods, networks, and devices that allow a non-real-time (NRT) radio access network (RAN) Intelligent Controller (RIC) to control both the RAN and the core network in a coordinated manner as well as access data from both the RAN and core network through the network interface disclosed herein. The data sharing and coordinated control of the provided systems, methods, networks, and devices significantly mitigate conflicts between the RAN and core state machines, thereby addressing performance degradation. Furthermore, the provided systems, methods, networks, and devices include the ability to access enriched information from core network in the NRT RIC, allowing artificial intelligence (AI)/machine learning (ML) models in the rApps or xApps to make more informed decisions based on enriched data input, thereby improving end-to-end network performance.

Thus, provided are a method and system for retrieving, by a NRT RIC from a core network external to the NRT RIC via a first external interface, first enrichment data corresponding to core network information, determining, by the NRT RIC, at least one policy/control to be implemented in a RAN including the NRT RIC, based on the first enrichment data, and implementing, by the NRT RIC, the at least one policy/control in the RAN. The first enrichment data may include at least one of user level information, subscription priority information, network slice registration information, and device capability information. The method and system may retrieve, by the NRT RIC from an inventory database external to the NRT RIC via a second external interface, second enrichment data corresponding to inventory information of devices connected to the RAN, where the at least one policy/control is further determined based on the second enrichment data.

The method and system may retrieve, the NRT RIC from a geolocation database external to the NRT RIC via a third external interface, third enrichment data corresponding to location information of the RAN, where the at least one policy/control is further determined based on the third enrichment data. The method and system may access, by the NRT RIC via a fourth external interface, at least one AI/ML/AN engine external to the NRT RIC for performing at least one processing task related to at least one of AI/ML model training, evolution, testing and performance assurance. The method and system may retrieve, by the NRT RIC from a planning database external to the NRT RIC via a fifth external interface, fourth enrichment data corresponding to network planning data, where the at least one policy/control is further determined based on the fourth enrichment data. The method and system may further retrieve, by the NRT RIC from the core network external to the NRT RIC via the first external interface, fifth enrichment data corresponding to new core network information, update, by the NRT RIC, the at least one policy/control based on the fifth enrichment data, and implement, by the NRT RIC, the updated at least one policy/control in the RAN.

Further provided a method and system for policy/control implementation. The method and system may retrieve, by a core network from a NRT RIC external to the core network via a first external interface, first enrichment data corresponding to RAN information, determine, by the core network, at least one policy/control to be implemented in the core network, based on the first enrichment data, and implement, by the core network, the at least one policy/control in the core network.

Figure 4:
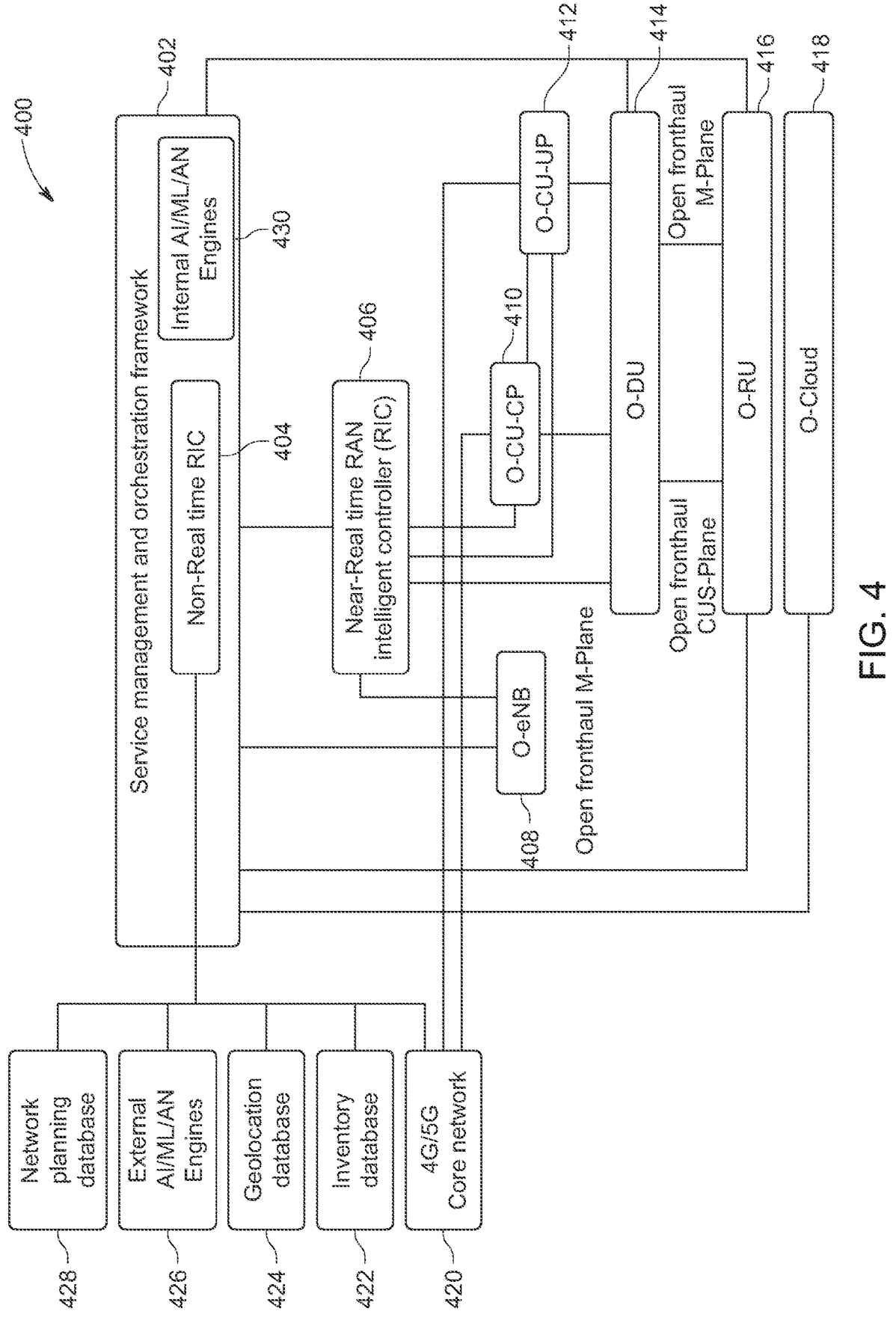
FIG. 4 is a diagram of an O-RAN architecture, according to an embodiment.

FIG. 4 is a diagram of an open RAN (O-RAN) architecture 400, according to an embodiment. The O-RAN architecture 400 may include a Service Management and Orchestration (SMO) framework 402 having an NRT RIC 404, a near-real-time (nRT) RIC 406, an open evolved NodeB (O-eNB) 408, an O-RAN Centralized Unit (O-CU) control plane (O-CU-CP) 410, an O-CU user plane (O-CU-UP) 412, an O-RAN Distributed Unit (O-DU) 414, an O-RAN Radio Unit (O-RU) 416, and an O-RAN Cloud (O-Cloud) 418. The O-RAN architecture 400 may include a core network 420 configured to interface with the SMO framework 402, the O-CU-CP 410, and O-CU-UP 412.

As shown in FIG. 4, an interface (e.g., a novel open or standardized interface) between the SMO framework 402 and the core network 420 is provided. Through the novel interface in accordance with example embodiments, the SMO framework 402 or the NRT RIC 404 may access the data from the core network 420 (e.g., $4^{th}$ generation (4G)-long term evolution (LTE) evolved packet core (EPC), $5^{th}$ generation (5G) new radio (NR) Core, other next generation cores, etc.). Through this interface, the user equipment (UE) specific core network information may be accessed, including registration information, UE identifier (ID) and others. The architecture 400 may include distinct interfaces for the inventory data, geolocation data, planning data, as well as externally or remotely hosted AI, ML or autonomous networks (AN) engines (e.g., an AI/ML/AN may be implemented at a different site). This enrichment data may be used to configure the policies at the SMO framework 402 as well for the cloud related functions. The planning data, inventory data, geolocation data (e.g., geolocation data of the deployed network elements) and the core data (e.g., data UE or user specific subscriptions and ID, data regarding user subscription priorities, data regarding device priorities, etc.) may be used for anomaly detection, as well as training the AI/ML models for the cases where insufficient recent data is available.

The NRT RIC 404 may configure and control both the core network 420 and the RAN in a coordinated manner through the interface for conflict mitigation and performance enhancement. Thus, provided are interfaces, including an interface I1 between the NRT RIC 404 and the core network 420, as well as interface I2 between the NRT RIC 404 and an inventory database 422, interface I3 between the NRT RIC 404 and a geolocation database 424, interface I4 between the NRT RIC 404 and external AL/ML/AN engines 426, and interface I5 the NRT RIC 404 and a network planning database 428. Although interfaces I1-I5 are depicted, additional interfaces may be provided without departing from the scope of the disclosure.

Regarding the core network 420 interface I1, the core network may operate in non-standalone (NSA) mode, standalone (SA) mode, dual mode, etc. The NRT RIC 404 may be configured to obtain user level information, including UE ID, subscription priority, network slice registration details, device capability information, etc., through the core network 420 interface I1. The NRT RIC 404 may be configured to obtain may include fault, configuration, accounting, performance and security (FCAPS) data from through the core network 420 interface I1. The NRT RIC 404 may be configured to update policies and configurations using the information obtained from the core network 420 via the interface I1. The NRT RIC 404 may determine to not expose the obtained information to rApps. However, a generic framework that works with rApps may be implemented, which addresses the user priority without disclosing user subscription information, or other sensitive information, to the applications.

Through the inventory database 422 interface I2, the inventory database 422 interface I2 may provide access to the NRT RIC 404 for information regarding the complete network inventory. With the inventory information, if certain existing configurations, configuration changes and/or configuration updates are not valid, which may be determined based on the inventory information from the inventory database 422, the NRT RIC 404 may be configured to address the non-valid configurations based on the inventory information.

Through the geolocation database 424 interface I3, the NRT RIC 404 may access geolocation information of the complete inventory (e.g., all devices accessing the network) or partial inventory of devices in deployment. Based on the geolocation information, the NRT RIC 404 may configure policies to the network nodes based on geolocations of devices. For example, if a particular area is affected by a natural disaster or some other type of network outage event, the NRT RIC 404 may configure a different priority and resources for that area under a predetermined duration or a duration of the network outage event. The access to the geolocation information may be complete access or partial access, and the accessed geolocation information may be provided to the rApps based on subscription information and permissions.

Through the AI/ML/AN engines 426 interface I4, the NRT RIC 404 may access external AI/ML/AN engines. The SMO framework 402 may both access an external AI/ML/AN engine via interface I4, as well as include internal AI/ML/AN engines 430, such that selective workloads may be distributed based on accuracy needs and latency (i.e., the SMO framework 402 may determine which of an external AI/ML/AN engine and an internal AI/ML/AN engine to perform a required processing task for, for example, AI/ML model training, evolution, testing and performance assurance, and further may divide the processing task between both the external AI/ML/AN engine and the internal AI/ML/AN engine as needed). The AN engine may include an evolution engine, a digital twin, and/or an AI/ML model.

Through the network planning database 428 interface I5, the NRT RIC 404 may access the network planning data, including the RAN nodes planning data, transport planning data, etc. Using the network planning data, the NRT RIC 404 may be configured to refine/update existing policies, implement a new policy/control, and/or generate a new policy/control as needed.

Thus, the O-RAN architecture 400 disclosed herein introduces interfaces between the SMO framework 402/NRT RIC 404 and the core network 420, as well as the inventory database 422, the geolocation database 424, AI/ML/AN engines 426, and the network planning database 428, to allow data sharing and coordinated control between the SMO framework 402/NRT RIC 404 and the core network 420, as well as the inventory database 422, the geolocation database 424, AI/ML/AN engines 426, and the network planning database 428. Through the interfaces, the NRT RIC 404 may access the data from the core network 420, along with the inventory data, geolocation data, planning data as well as externally or remotely hosted AI/ML engine. This data may be utilized to configure the policies in the NRT RIC 404 as well for the cloud related functions. The planning data, inventory data, geolocation data and the core data (e.g., for UE/user specific subscription and ID) may be be used for anomaly detection, as well as training the AI/ML/AN models for the cases where insufficient data is available. Furthermore, the NRT RIC 404 may configure and control both the core network 420 and the RAN in a coordinated manner using the interfaces I1-I5 for conflict mitigation and performance enhancement.

FIG. 5 is a flowchart of a method for policy/control implementation in an O-RAN architecture, according to an embodiment. In operation 502, the system may retrieve, by the NRT RIC from a core network external to the NRT RIC via a first external interface, first enrichment data corresponding to core network information. In operation 504, the system may determine, by the NRT RIC, at least one policy/control to be implemented in a RAN including the NRT RIC, based on the first enrichment data. In operation 506, the system may implement, by the NRT RIC, the at least one policy/control in the RAN.

Figure 6:
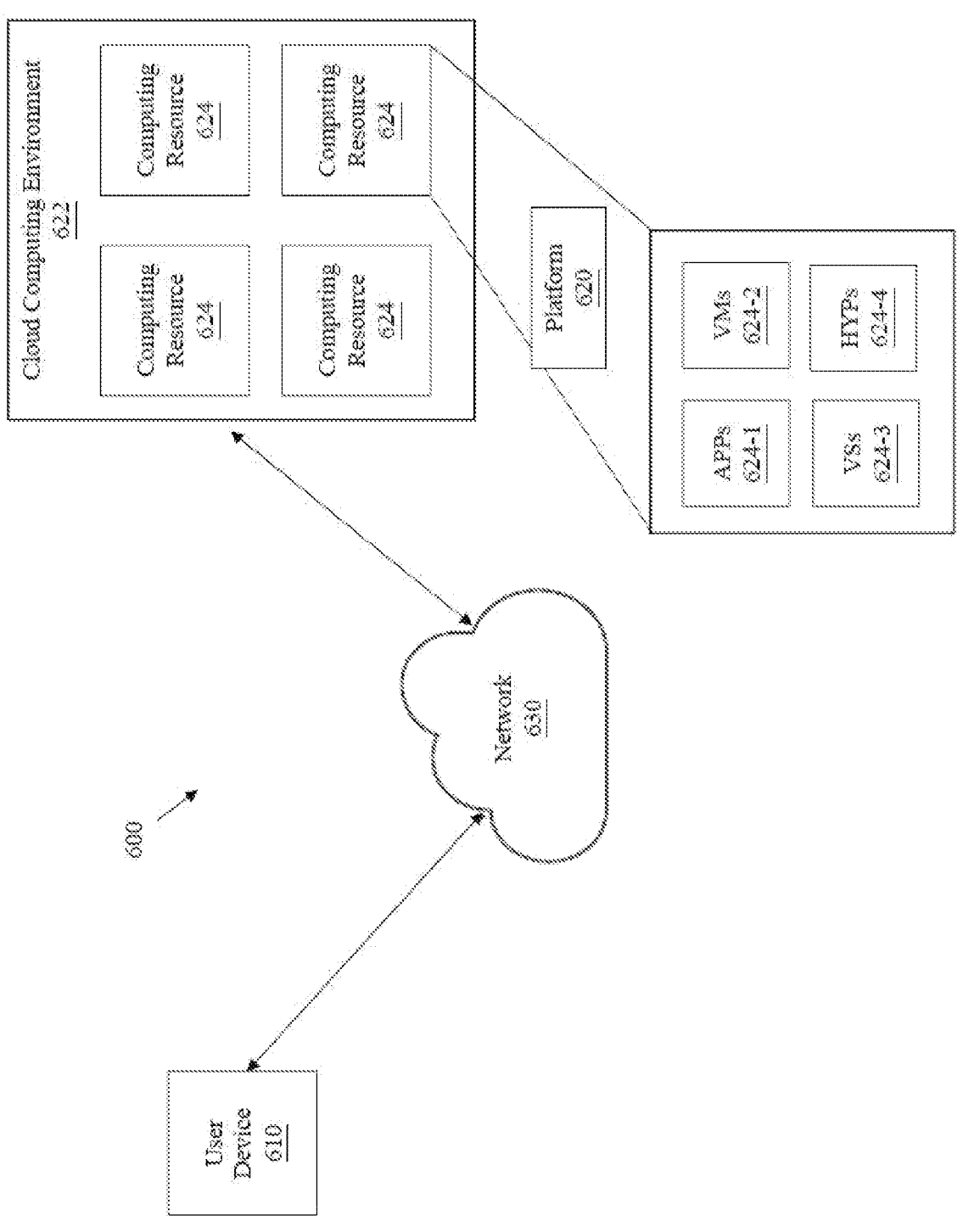
FIG. 6 is a diagram of an example environment in which systems and/or methods, described herein, may be implemented, according to an embodiment.

FIG. 6 is a diagram of an example environment 600 in which systems and/or methods, described herein, may be implemented. As shown in FIG. 6, environment 600 may include a user device 610, a platform 620, and a network 630. Devices of environment 600 may interconnect via wired connections, wireless connections, or a combination of wired and wireless connections. In embodiments, any of the functions and operations described with reference to FIG. 6 above may be performed by any combination of elements illustrated in FIG. 6.

User device 610 includes one or more devices capable of receiving, generating, storing, processing, and/or providing information associated with platform 620. For example, user device 610 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 610 may receive information from and/or transmit information to platform 620.

Platform 620 includes one or more devices capable of receiving, generating, storing, processing, and/or providing information. In some implementations, platform 620 may include a cloud server or a group of cloud servers. In some implementations, platform 620 may be designed to be modular such that certain software components may be swapped in or out depending on a particular need. As such, platform 620 may be easily and/or quickly reconfigured for different uses.

In some implementations, as shown, platform 620 may be hosted in cloud computing environment 622. Notably, while implementations described herein describe platform 620 as being hosted in cloud computing environment 622, in some implementations, platform 620 may not be cloud-based (i.e., may be implemented outside of a cloud computing environment) or may be partially cloud-based.

Cloud computing environment 622 includes an environment that hosts platform 620. Cloud computing environment 622 may provide computation, software, data access, storage, etc. services that do not require end-user (e.g., user device 610) knowledge of a physical location and configuration of system(s) and/or device(s) that hosts platform 620. As shown, cloud computing environment 622 may include a group of computing resources 624 (referred to collectively as "computing resources 624" and individually as "computing resource 624").

Computing resource 624 includes one or more personal computers, a cluster of computing devices, workstation computers, server devices, or other types of computation and/or communication devices. In some implementations, computing resource 624 may host platform 620. The cloud resources may include compute instances executing in computing resource 624, storage devices provided in computing resource 624, data transfer devices provided by computing resource 624, etc. In some implementations, computing resource 624 may communicate with other computing resources 624 via wired connections, wireless connections, or a combination of wired and wireless connections.

As further shown in FIG. 6, computing resource 624 includes a group of cloud resources, such as one or more applications ("APPs") 624-1, one or more virtual machines ("VMs") 624-2, virtualized storage ("VSs") 624-3, one or more hypervisors ("HYPs") 624-4, or the like.

Application 624-1 includes one or more software applications that may be provided to or accessed by user device 610. Application 624-1 may eliminate a need to install and execute the software applications on user device 610. For example, application 624-1 may include software associated with platform 620 and/or any other software capable of being provided via cloud computing environment 622. In some implementations, one application 624-1 may send/receive information to/from one or more other applications 624-1, via virtual machine 624-2.

Virtual machine 624-2 includes a software implementation of a machine (e.g., a computer) that executes programs like a physical machine. Virtual machine 624-2 may be either a system virtual machine or a process virtual machine, depending upon use and degree of correspondence to any real machine by virtual machine 624-2. A system virtual machine may provide a complete system platform that supports execution of a complete operating system ("OS"). A process virtual machine may execute a single program, and may support a single process. In some implementations, virtual machine 624-2 may execute on behalf of a user (e.g., user device 610), and may manage infrastructure of cloud computing environment 622, such as data management, synchronization, or long-duration data transfers.

Virtualized storage 624-3 includes one or more storage systems and/or one or more devices that use virtualization techniques within the storage systems or devices of computing resource 624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 624-4 may provide hardware virtualization techniques that allow multiple operating systems (e.g., "guest operating systems") to execute concurrently on a host computer, such as computing resource 624. Hypervisor 624-4 may present a virtual operating platform to the guest operating systems, and may manage the execution of the guest operating systems. Multiple instances of a variety of operating systems may share virtualized hardware resources.

Network 630 includes one or more wired and/or RANs. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
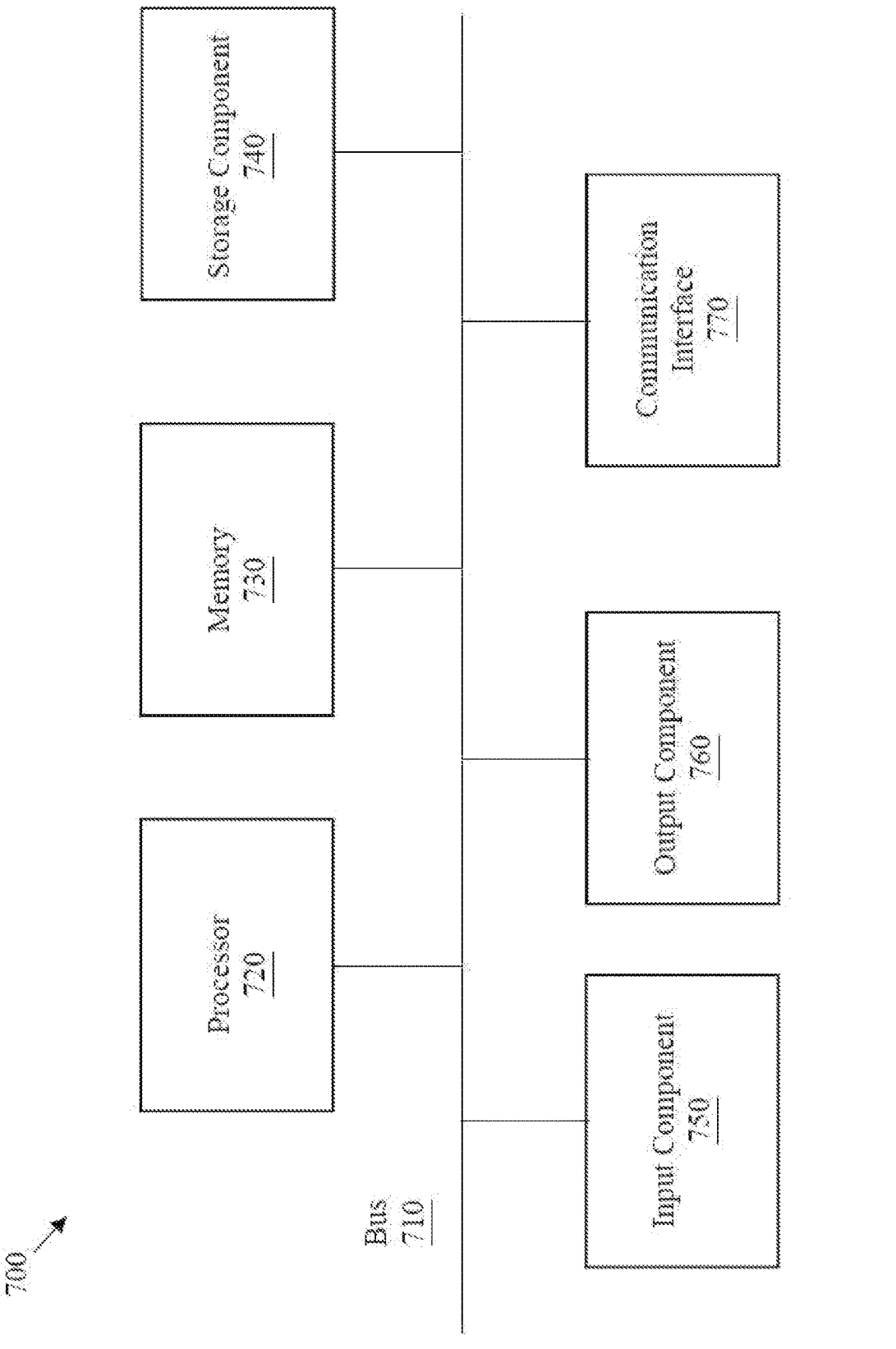
FIG. 7 is a diagram of example components of a device according to an embodiment.

FIG. 7 is a diagram of example components of a device 700. Device 700 may correspond to user device 610 and/or platform 620. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 may be implemented in hardware, firmware, or a combination of hardware and software. Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes in response to processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

In embodiments, any one of the operations or processes of FIGS. 4-5 may be implemented by or using any one of the elements illustrated in FIGS. 6 and 7. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for policy/control implementation, comprising:

retrieving, by a non-real-time (NRT) radio access network (RAN) Intelligent Controller (RIC) from a core network external to the NRT RIC via a first external interface, first enrichment data corresponding to core network information, the first enrichment data comprising user equipment-specific network registration data registered in the core network;

determining, by the NRT RIC, at least one policy/control to be implemented in a RAN including the NRT RIC, based on the user equipment-specific network registration data comprised in the first enrichment data received from the core network, the RAN and the core network being of a same telecommunications network to provide telecommunications service of the same telecommunications network; and implementing, by the NRT RIC, the at least one policy/control in the RAN.

2. The method of claim 1, wherein the first enrichment data comprises at least one of subscription priority information, network slice registration information, and device capability information.

3. The method of claim 1, further comprising retrieving, by the NRT RIC from an inventory database external to the NRT RIC via a second external interface, second enrichment data corresponding to inventory information of devices connected to the RAN, wherein the at least one policy/control is further determined based on the second enrichment data.

4. The method of claim 1, further comprising retrieving, by the NRT RIC from a geolocation database external to the NRT RIC via a third external interface, third enrichment data corresponding to location information of the RAN, wherein the at least one policy/control is further determined based on the third enrichment data.

5. The method of claim 1, further comprising accessing, by the NRT RIC via a fourth external interface, at least one artificial intelligence (AI)/machine learning (ML)/autonomous network (AN) engine external to the NRT RIC for performing at least one processing task related to at least one of AI/ML model training, evolution, testing and performance assurance.

6. The method of claim 1, further comprising retrieving, by the NRT RIC from a planning database external to the NRT RIC via a fifth external interface, fourth enrichment data corresponding to network planning data, wherein the at least one policy/control is further determined based on the fourth enrichment data.

7. The method of claim 1, further comprising, after implementing the determined at least one policy/control in the RAN:

retrieving, by the NRT RIC from the core network external to the NRT RIC via the first external interface, fifth enrichment data corresponding to new core network information;

updating, by the NRT RIC, the at least one policy/control based on the fifth enrichment data; and implementing, by the NRT RIC, the updated at least one policy/control in the RAN.

8. A system for policy/control implementation, comprising:

a memory storing instructions; and a processor configured to execute the instructions to:

retrieve, by a non-real-time (NRT) radio access network (RAN) Intelligent Controller (RIC) from a core network external to the NRT RIC via a first external interface, first enrichment data corresponding to core network information, the first enrichment data comprising user equipment-specific network registration data registered in the core network;

determine, by the NRT RIC, at least one policy/control to be implemented in a RAN including the NRT RIC, based on the user equipment-specific network registration data comprised in the first enrichment data received from the core network, the RAN and the core network being of a same telecommunications network to provide telecommunications service of the same telecommunications network; and implement, by the NRT RIC, the at least one policy/control in the RAN.

9. The system of claim 8, wherein the first enrichment data comprises at least one of user level information, subscription priority information, network slice registration information, and device capability information.

10. The system of claim 8, wherein the processor is further configured to execute the instructions to retrieve, by the NRT RIC from an inventory database external to the NRT RIC via a second external interface, second enrichment data corresponding to inventory information of devices connected to the RAN, and wherein the at least one policy/control is further determined based on the second enrichment data.

11. The system of claim 8, wherein the processor is further configured to execute the instructions to retrieve, by the NRT RIC from a geolocation database external to the NRT RIC via a third external interface, third enrichment data corresponding to location information of the RAN, and wherein the at least one policy/control is further determined based on the third enrichment data.

12. The system of claim 8, wherein the processor is further configured to execute the instructions to access, by the NRT RIC via a fourth external interface, at least one artificial intelligence (AI)/machine learning (ML)/autonomous network (AN) engine external to the NRT RIC for performing at least one processing task related to at least one of AI/ML model training, evolution, testing and performance assurance.

13. The system of claim 8, wherein the processor is further configured to execute the instructions to retrieve, by the NRT RIC from a planning database external to the NRT RIC via a fifth external interface, fourth enrichment data corresponding to network planning data, and wherein the at least one policy/control is further determined based on the fourth enrichment data.

14. The system of claim 8, further comprising, after implementing the determined at least one policy/control in the RAN, the processor is further configured to execute the instructions to:

retrieve, by the NRT RIC from the core network external to the NRT RIC via the first external interface, fifth enrichment data corresponding to new core network information;

update, by the NRT RIC, the at least one policy/control based on the fifth enrichment data; and implement, by the NRT RIC, the updated at least one policy/control in the RAN.

15. A non-transitory computer-readable storage medium storing instructions that, when executed by at least one processor, cause the at least one processor to:

retrieve, by a non-real-time (NRT) radio access network (RAN) Intelligent Controller (RIC) from a core network external to the NRT RIC via a first external interface, first enrichment data corresponding to core network information, the first enrichment data comprising user equipment-specific network registration data registered in the core network;

determine, by the NRT RIC, at least one policy/control to be implemented in a RAN including the NRT RIC, based on the user equipment-specific network registration data comprised in the first enrichment data received from the core network, the RAN and the core network being of a same telecommunications network to provide telecommunications service of the same telecommunications network; and implement, by the NRT RIC, the at least one policy/control in the RAN.

16. The storage medium of claim 15, wherein the first enrichment data comprises at least one of user level information, subscription priority information, network slice registration information, and device capability information.

17. The storage medium of claim 15, wherein the instructions, when executed, further cause the at least one processor to retrieve, by the NRT RIC from an inventory database external to the NRT RIC via a second external interface, second enrichment data corresponding to inventory information of devices connected to the RAN, and wherein the at least one policy/control is further determined based on the second enrichment data.

18. The storage medium of claim 15, wherein the instructions, when executed, further cause the at least one processor to retrieve, by the NRT RIC from a geolocation database external to the NRT RIC via a third external interface, third enrichment data corresponding to location information of the RAN, and wherein the at least one policy/control is further determined based on the third enrichment data.

19. The storage medium of claim 15, wherein the instructions, when executed, further cause the at least one processor to access, by the NRT RIC via a fourth external interface, at least one artificial intelligence (AI) engine external to the NRT RIC for performing at least one processing task related to the determination of the at least one policy/control.

20. The storage medium of claim 15, wherein the instructions, when executed, further cause the at least one processor to retrieve, by the NRT RIC from a planning database external to the NRT RIC via a fifth external interface, fourth enrichment data corresponding to network planning data, and wherein the at least one policy/control is further determined based on the fourth enrichment data.

21. A method for policy/control implementation, comprising:

retrieving, by a core network from a non-real-time (NRT) radio access network (RAN) Intelligent Controller (RIC) external to the core network via a first external interface, first enrichment data corresponding to RAN information;

determining, by the core network, at least one policy/control to be implemented in the core network, based on the first enrichment data; and implementing, by the core network, the at least one policy/control in the core network.

\* \* \* \* \*